March 8, 1932. G. WILSON ET AL 1,848,761
SPRAGGING DEVICE FOR MOTOR VEHICLES
Filed July 17, 1930 2 Sheets-Sheet 1

INVENTORS:
George Wilson
and Harold J. H. Moore
BY
ATTORNEY

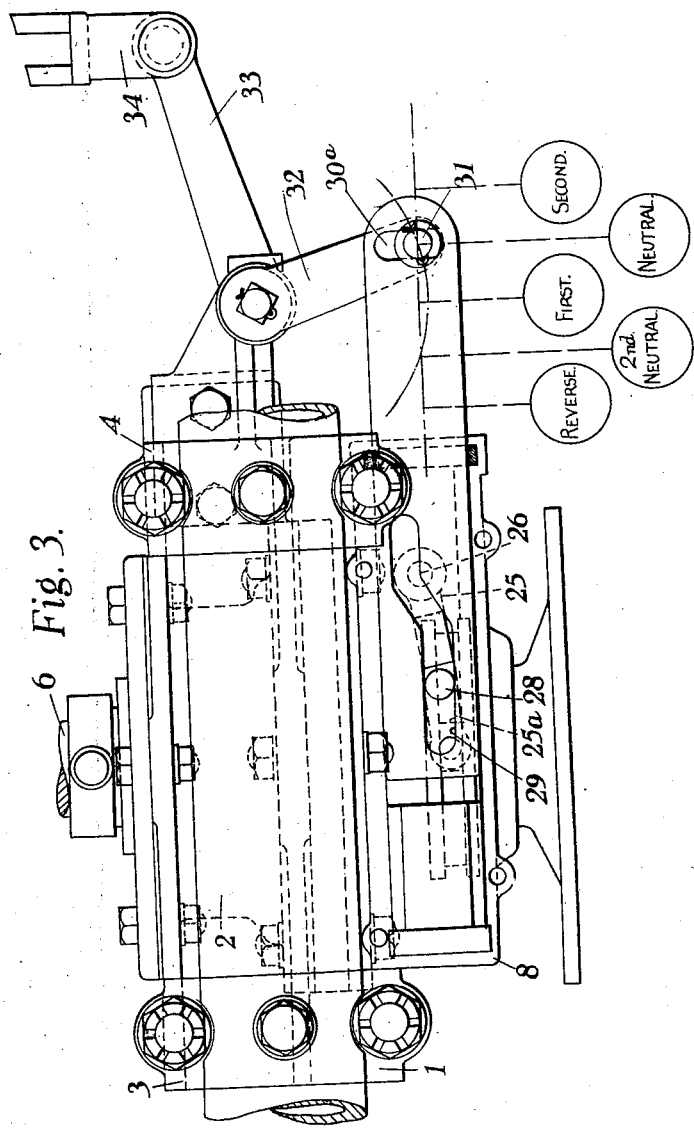

Patented Mar. 8, 1932

1,848,761

UNITED STATES PATENT OFFICE

GEORGE WILSON, OF NEWCASTLE-ON-TYNE, AND HAROLD JOHN HENRY MOORE, OF GATESHEAD, ENGLAND

SPRAGGING DEVICE FOR MOTOR VEHICLES

Application filed July 17, 1930, Serial No. 468,724, and in Great Britain July 20, 1929.

This invention relates to spragging devices for motor vehicles, of the kind comprising pawls mounted to rotate with the transmission shaft and adapted to engage a stationary ratchet, the pawls being loaded on one side so that when a predetermined speed is attained centrifugal force will cause the pawls to be withdrawn from engagement with the ratchet wheel, while means controllable at will are provided for rendering the pawls inoperative independently of the speed of the vehicle.

The invention consists in forming the loaded portion of each pawl separate from the engaging portion or pawl proper, so that when the pawls are in engagement with the ratchet teeth, the loaded portions do not move as the pawls are oscillated as a result of the turning of the pawls about the ratchet wheel, but when the loaded portions move outwards they carry the pawls proper with them to withdraw them from engagement with the ratchet teeth.

The invention will now be described with reference to the accompanying drawings which show the device applied to a heavy vehicle.

In the said drawings:

Fig. 3 is a plan of Fig. 1 with the cam plate casing cover removed.

Figure 1:
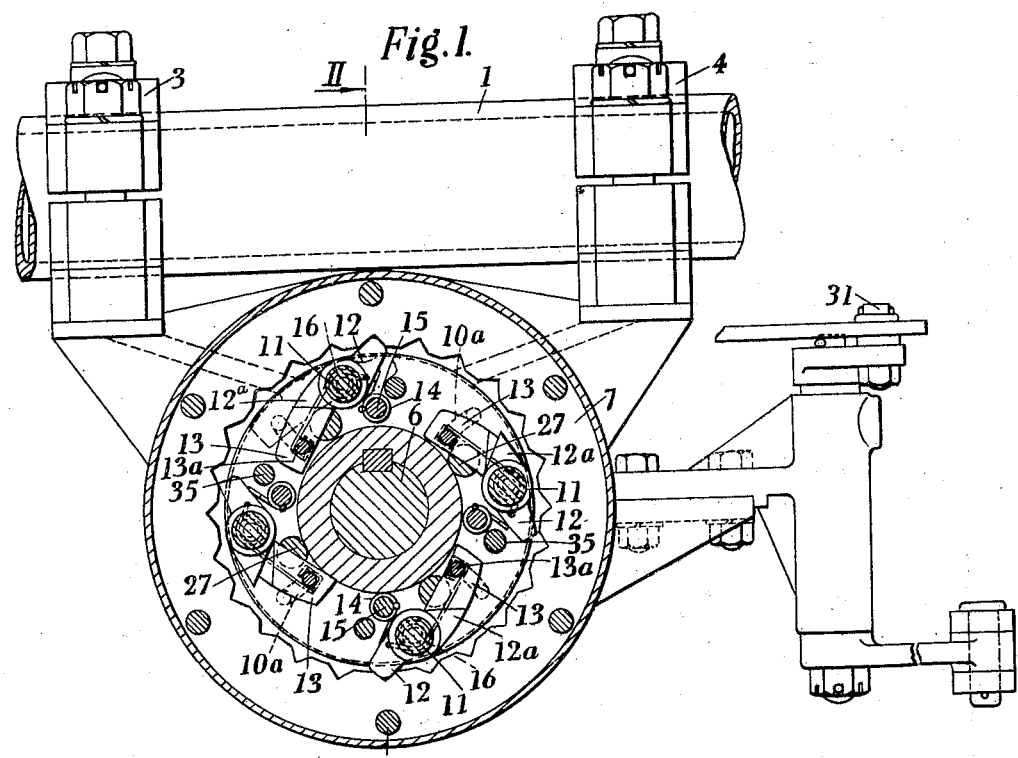
Fig. 1 is a cross-sectional elevation taken on the line I—I of Fig. 2.
Figure 2:
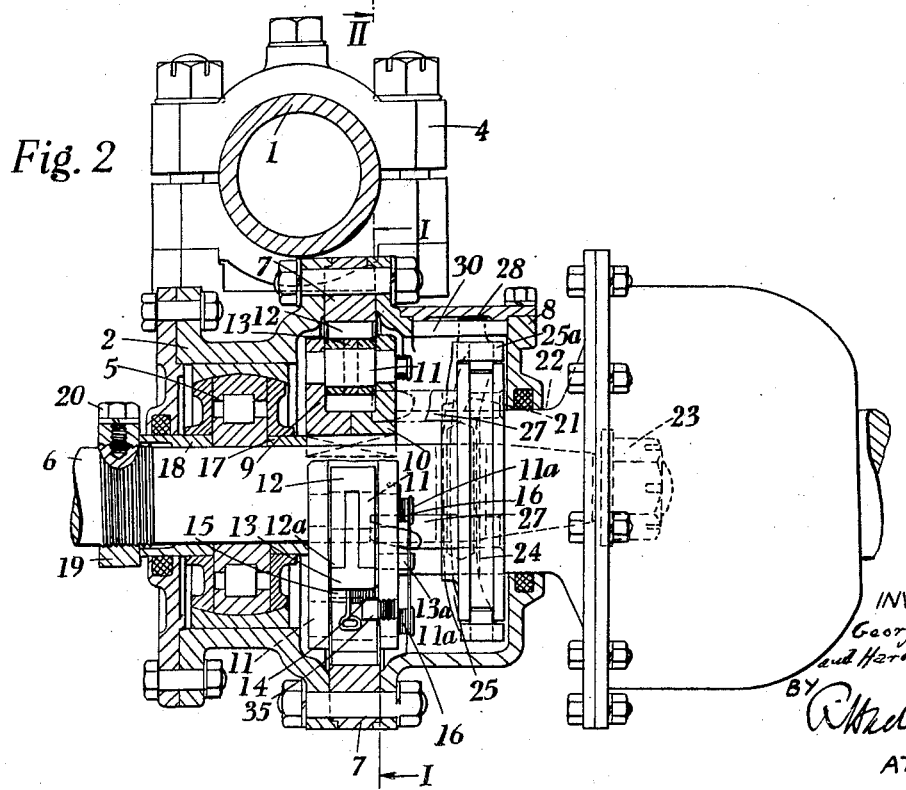
Fig. 2 is a sectional elevation taken on the line II—II of Fig. 1 but with the lower portion of the pawl gear shown in elevation.

Referring more particularly to the drawings, 1 is a cross member on the chassis frame from which is suspended the sprag casing. This casing comprises a short cylindrical member 2 secured by means of two clamps 3, 4 to the cross member 1. The member 2 forms a housing for a roller bearing 5 which supports the Cardan shaft 6. Bolted to the rear of the member 2 is a ratchet toothed ring 7 and a further casing member 8.

Keyed to the shaft is a pair of flanged discs 9, 10, between which are pivotally mounted on pins 11, pawls 12, 13. The said pawls comprise a pawl proper 12 having its pivotal end forked to receive the end of a weight 13, both the pawl and the weight being pivotally mounted about the pin 11. The pawl 12 has a projection 12a against which the weight 13 abuts when it moves outwards under centrifugal force; but when the centrifugal force is too small to influence the weight, movement of the pawl tooth occurs independently of the weight 13.

Coil springs 14 wrapped around pins 15 arranged between the discs 9, 10, serve to maintain the pawls 12 in engagement with the teeth of the ratchet ring 7; while coil springs 16 wrapped around projection 11a on the pins 11 and having one of their ends pressing against projections 13a on the weights 13 serve to maintain the said weights in their inner position when there is no centrifugal force of any consequence. The projections 13a pass through slots 10a (shown in chain-dotted lines in Fig. 1) in the disc 10. The springs 16 are shown in chain-dotted lines in Fig. 1 as they are above the plane of the drawings.

A distance piece 17 is arranged between the roller bearing 5 and the disc 9, and another distance piece 18 between the bearing 5 and an adjusting nut 19, a set screw 20 being provided thereon for locking purposes. On the rear side of the disc 10 is a distance sleeve 21 against which abuts a flanged cylindrical member 22, forming part of a universal coupling, the said member 22 being held firmly on the tapered end of the shaft 6 by means of a nut 23. When the nut 23 is tightened up as far as it will go the nut 19 is then tightened up and so the various members between the two nuts 19 and 23 held firmly together, the nut 19 being locked by means of the set screw 20.

The distance sleeve 21 is of the same diameter as the cylindrical portion of the member 22 so as to provide a continuous surface on which is slidably mounted a grooved collar 24, with the groove of which engages a forked bridle arm 25 pivotally mounted in the casing 8 at 26. Rigid with the said collar 24 are four pins 27 having chamfered ends which extend underneath the weights 13 so that on moving the ring 24 longitudinally the inclined faces on the said pins will cause the weights 13 to be pushed outwards, and therefore the pawls 12 to be withdrawn from the ratchet ring 7.

Projecting upwards from the upper arm 25a of the bridle 25 is a pin 28 which engages with a cam slot 29 in a cam plate 30 slidably mounted in the top of the casing 8. The said plate 30 has a slot at 30a with which engages a pin 31 on the end of an arm 32 of a bell crank lever whose other arm 33 is connected by means of a link 34 to the "reverse", "first" and "second" gear selector of the vehicle. The cam slot 29 is of a shape so that in certain of the gear positions for example as shown, "reverse" and "second neutral" the collar 24 is moved towards the weights 13 to throw the pawls out of engagement with the teeth of the ratchet ring 7. Stops 35 on the disc 10 limit the inward travels of the pawls 12.

The operation of the device is as follows:— When the vehicle is running below a predetermined speed, for example a Cardan shaft speed of about 400 revolutions per minute, the pawls 12 will be in engagement with the teeth of the ratchet ring 7 for all forward speeds. However when the said predetermined speed is exceeded, centrifugal force will cause the weights 13 to move outwards against the action of their springs 16, and owing to their abutting against the projections 12a on the pawls 12 the latter are withdrawn from engagement with the ratchet ring 7 as shown in dotted lines for one of the pawls in Fig. 1. In this connection, it is to be noted that the weights of the loaded portions of the pawls must be such that the centrifugal force generated at the critical speed will be sufficient to overcome the pressure of the springs 14 and 16.

When the vehicle is running at low speed so that the pawls are in operation, the weights 13 will remain stationary as the pawls are moved inwards by the teeth of the ring 7, as shown with regard to two opposite pawls in Fig. 1. Inertia stresses are thus reduced and the wear between the pawls and ratchet teeth is not so heavy as would be the case if the weights and pawls were in one.

The drawings show the position of the device when the gear selector is in neutral, in which position the pins 27 are withdrawn from engagement with the weights 13 so that the pawls 12 are in engagement with the ratchet ring 7. As will be seen from Fig. 3 which shows the positions of the plate for the various gear positions controlled by the gear selector to which it is connected, for first and second gear positions, the pin 28 remains in the position shown, while for second neutral and reverse, the said pin is moved into the position of disengagement. In the reverse position the pin 28 occupies the righthand end of the upper portion of the cam groove, while in the second neutral position the said pin occupies the upper portion of the cam groove adjacent the inclined portion. Hence in the event of the gear lever being moved to the second neutral position after being in reverse, while the vehicle is still moving backwards, the device remains out of operation and no damage is caused. Only when a forward gear is engaged is the device again made operative.

We claim:—

1. A spragging device for motor vehicles comprising a transmission shaft, a casing around said shaft, a ratchet wheel rigid with said casing and concentric with said shaft, a pawl carrying member on said shaft, pawls pivotally mounted on said pawl carrying member and adapted to engage with said ratchet wheel, abutments on said pawls remote from their engaging faces, and weights pivoted on said pawl carrying member, said weights being adapted after a predetermined amount of outward movement to abut against the abutments on the pawls so as to force their engaging faces inwards.

2. A spragging device according to claim 1, and springs adapted to abut against said weights to press them inwards when the shaft is rotating below a predetermined speed.

3. A spragging device according to claim 1, a grooved collar, chamfered pins on said collar, the chamfered portion of each of said pins lying on the inside of each pivoted weight and means for moving said grooved collar axially.

4. A spragging device according to claim 1, a grooved collar, chamfered pins on said collar, the chamfered portion of each of said pins lying on the inside of each pivoted weight and means for moving said grooved collar axially, a projection on the means for moving the grooved collar axially, a slidable cam plate adapted to be connected with the vehicle gear controlling means, a cam slot in said cam plate, said cam slot being in engagement with the said projection, so that for certain gear positions the device may be rendered inoperative.

In witness whereof we have signed this specification.

GEORGE WILSON.
HAROLD J. H. MOORE.